J. E. BROCK.
JAW TRAP.
APPLICATION FILED JUNE 7, 1909.
956,624.
Patented May 3, 1910.
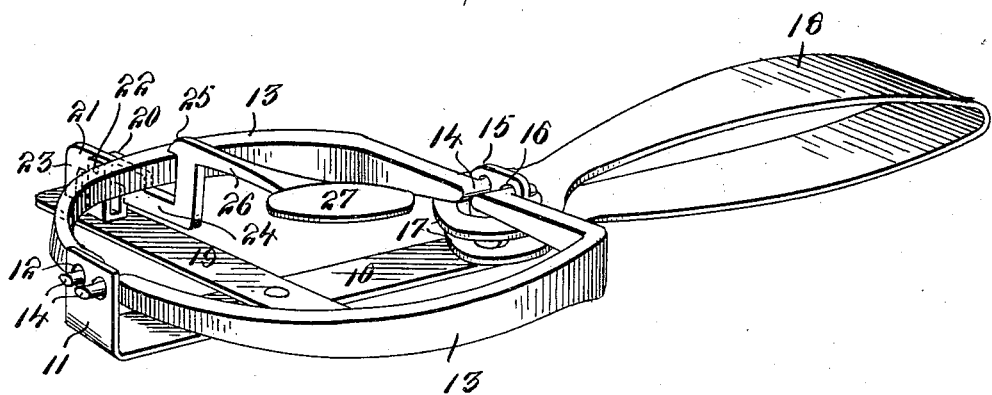
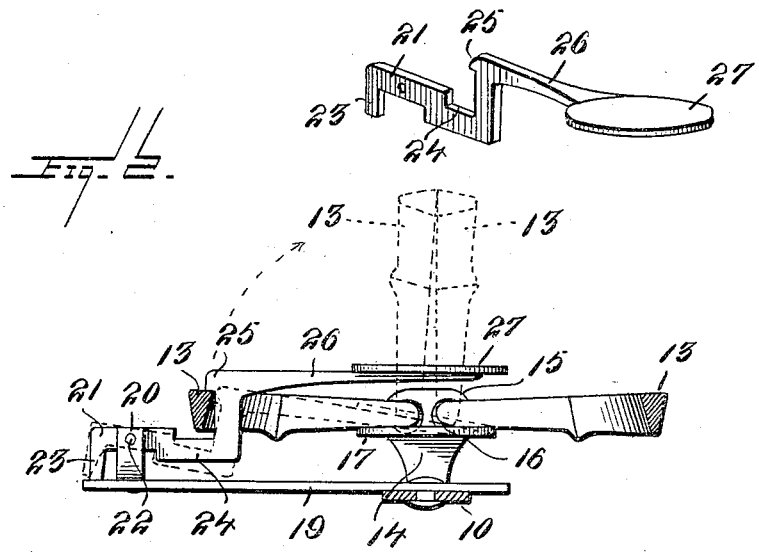
WITNESSES:
INVENTOR
John Elmer Brock.
BY
Attorney ize the trap setting operation. An advantage found in this structure resides in the fact that when the trap is sprung the arm and jaw being at opposite sides of the pivot 22 swing in opposite directions thus insuring a quick release of the jaw.

UNITED STATES PATENT OFFICE.

JOHN ELMER BROCK, OF MAYOWORTH, WYOMING.

JAW-TRAP.

956,624.     Specification of Letters Patent.     Patented May 3, 1910.

Application filed June 7, 1909. Serial No. 500,560.

*To all whom it may concern:*

Be it known that I, JOHN ELMER BROCK, a citizen of the United States, residing at Mayoworth, county of Johnson, and State of Wyoming, have invented certain new and useful Improvements in Jaw-Traps, of which the following is a specification, reference being had therein to the accompanying drawing.

This invention relates to a jaw trap, and particularly to a form in which the jaws are held in open or set position by means of a bait holding arm.

The invention has for an object to provide a construction entirely dispensing with the use of a spring connection with the bait arm, and providing for the pivoting of this arm at a point outside of one jaw when the trap is set so that the trigger lug upon the arm will engage the inner edge of said jaw, and the arm and jaw swing in opposite directions when the trap is sprung thus securing a sensitive action in a structure not liable to be accidentally sprung by a small animal passing thereover.

Other and further objects and advantages of the invention will be hereinafter fully set forth and the novel features thereof defined by the appended claims.

In the drawing:—Figure 1 is a perspective of the invention; Fig. 2 is a vertical section; Fig. 3 is a detail perspective of the bait arm.

Like numerals refer to like parts in the several views of the drawing.

The numeral 10 designates the base plate of the trap which is upturned at one end 11 and there provided with pivoting apertures 12 to receive the opposite jaws 13 of the trap. These apertures are of greater diameter than the pintles 14 of the jaws in order to allow a slight lateral movement of the jaw in setting the trap. The opposite end of the base plate is provided with a post 15 also provided with enlarged apertures 16 to receive the pintles 14 of the jaws. Between the under face of the jaws and the top of the base plate the free ends 17 of the loop spring 18 are disposed. These ends are apertured to surround the post and exert tension against the under face of the jaws. The jaws are preferably formed of tapering cross section, as shown in Fig. 2 which facilitates the setting of the trap as hereinafter explained.

Extended laterally from the base plate 10 is a cross plate 19 having at its outer end the pivoting post 20, preferably formed of parallel members, as shown in Fig. 1. In this post the pan arm 21 is mounted by means of the pivot 22 and is provided at the outer side of the post with a lifting arm having a depending lug 23 adapted to engage the plate 19 and limit the upward movement of the arm 21. This arm is formed at the inner side of the pivot with a depressed portion 24 disposed beneath the position of the jaw when open, as shown in Fig. 2. At the inner side of the depressed portion 24 the arm is provided with a trigger or holding shoulder 25 adapted to engage the upper flat face of the jaw and disposed at a point above the plane of the pivot of the arm. The portion 26 of the arm extends toward the center of the trap and may be there provided with any desired form of bail pan or holder 27.

In the operation of the invention it will be seen that when the trap is set, as shown by full lines in Fig. 2, the jaw lies beneath the trigger of the arm and owing to its upward tension firmly holds the trap in set position so that it is not liable to be accidentally sprung by contact with small animals, and this holding arrangement entirely obviates the necessity of the use of springs for retaining the bait arm in raised position. The use of such a spring creates a friction and a resistance to the action of the main trap spring which renders the trap difficult to be sprung, while the springs are affected by temperature, moisture and the collection of dirt about the same when the trap is placed upon the ground. In this construction, the arm when in raised position is supported beyond the pivot by the lug 23 against further elevation, and the jaws and bait pan are held in a horizontal plane. For the purpose of raising the bait arm into holding position without introducing the hand into the space between the jaws, pressure is applied to the horizontal portion of the lifting arm which is disposed at the opposite side of the pivot post from the trigger shoulder and thus provides means by which the trap may be safely set. When weight is placed upon the arm sufficient to overcome frictional resistance between the shoulder thereof and the jaw this arm swings inward and downward so as to freely and quickly release itself from the jaw, while the latter travels upward and inward in a path at an angle to that of the arm thus securing a quick and sensitive release of the jaw when a proper weight has been applied thereto. In the operation of setting the trap, the jaw is swung downward and owing to the lateral movement allowed by its pivots passes over the trigger of the arm and under the tension of the trap spring is drawn back beneath this trigger so as to at once raise the arm into the set position, as shown in Fig. 2.

The stop lug upon the arm prevents the arm being thrown entirely outward from the jaws, and also limits the vertical movement thereof, while the structure of this arm provides a firm and rigid construction not readily affected by dirt, temperature or moisture, and especially adapted for use for large animals in which it is not desired that the trap be sprung by small animals or slight contact with the bait arm. The pivot for the arm is disposed at a point removed from the outer face of the jaw so as to form a long leverage in order that the trigger shoulder of the arm may swing in a long arc to secure the most efficient releasing action of the jaw.

Having described my invention and set forth its merits, what I claim and desire to secure by Letters Patent is:—

In a jaw trap, a base plate having jaws separately pivoted upon a fixed part thereof, one of which is mounted for lateral movement at its pivot, a closing spring for said jaws, a lateral extension from said plate, a pivot post thereon outside of one jaw when in opened position, a bait arm pivoted upon said post and provided with a recessed portion beneath the trigger shoulder thereof and of greater dimension vertically and longitudinally than that of the jaw at its point of contact with said shoulder, and a lifting arm for said bait arm having a horizontal portion and a depending stop portion therefrom disposed at the opposite side of the pivot post from the trigger shoulder.

In testimony whereof I affix my signature in presence of two witnesses.

JOHN ELMER BROCK.

Witnesses:
 BURT GRIGGS,
 ARTHUR E. BROWN.